United States Patent
Eriksson

[15] 3,635,266
[45] Jan. 18, 1972

[54] PROCESS AND APPARATUS FOR DEBRANCHING FELLED TREES

[72] Inventor: Erik Helmer Eriksson, Soderhamn, Sweden

[73] Assignee: Mo och Domsjo Aktiebolaget, Ornskoldsvik, Sweden

[22] Filed: Nov. 20, 1969

[21] Appl. No.: 878,469

[30] Foreign Application Priority Data

Nov. 21, 1968 Sweden............................15826/68

[52] U.S. Cl.................................................144/2 Z
[51] Int. Cl..................................................A01g 23/02
[58] Field of Search...............144/2 Z, 3 D, 309 AC, 34 R, 144/34 E

[56] References Cited

UNITED STATES PATENTS

| | | | |
|---|---|---|---|
| 2,882,941 | 4/1959 | Pope | 144/3 D |
| 3,308,861 | 3/1967 | Hamilton | 144/2 Z |
| 3,443,611 | 5/1969 | Jorgensen | 144/2 Z |
| 3,480,109 | 11/1969 | Eitel et al | 212/144 |

Primary Examiner—Gerald A. Dost
Attorney—Janes & Chapman

[57] ABSTRACT

A method is provided for debranching felled trees at a high rate of speed, which comprises moving the tree in a longitudinal direction towards a debranching device, while simultaneously moving the debranching device in an opposite longitudinal direction, and debranching the tree in the course of such movement.

Apparatus is provided for debranching felled trees, which comprises, in combination, a pair of beam members movable towards and away from each other; means for effecting such relative movement; tree-gripping means and debranching means attached to one beam member, and arranged, respectively, to grasp the tree trunk and to remove branches from the trunk; tree feed means movably attached to the other beam member, and arranged to move along the beam member; tree-gripping means attached to the tree feed means, and arranged to grasp the tree trunk; and means for moving the tree feed means simultaneously with and in a direction opposite to the direction of the debranching means.

34 Claims, 4 Drawing Figures

PROCESS AND APPARATUS FOR DEBRANCHING FELLED TREES

Apparatus for debranching felled trees generally lift the felled tree from the surface of the ground, and move it in a longitudinal direction towards and through a stationary debranching means, which separates the branches and knots from the trunk of the tree. This requires that the heavy tree be moved through a distance which corresponds substantially to its length through the debranching means. If a high working capacity is to be obtained, this means that the tree trunk must be moved at a high rate of speed, and since the tree trunks are heavy, the amount of energy required for rapid movement is quite high.

In the process of the instant invention, these difficulties are avoided by moving the tree in a longitudinal direction towards a debranching device, while simultaneously moving the debranching device in an opposite longitudinal direction, and debranching the tree in the course of such movement. The debranching device is relatively light, compared to the weight of the tree, and can be moved at a rather high rate of speed, while the total rate of speed at which the tree is debranched is, of course, the sum of the two movements. The result is a considerably higher debranching rate, with a correspondingly reduced power consumption.

The invention also provides apparatus for debranching felled trees at a high rate of speed, which comprises, in combination, a pair of beam members, at least one of which is movable towards and away from the other; means for effecting such relative movement; tree-gripping means and debranching means attached to one beam member, and arranged, respectively, to grasp the tree trunk, and to remove branches from the trunk; tree feed means movably attached to the other beam member; and arranged to move along the beam member, tree gripping means attached to the tree feed means, and arranged to grasp the tree trunk, and means for moving the tree feed means simultaneously with and in a direction opposite to the direction of movement of the debranching means.

As a further feature of the invention, at least one of the beams can be arranged for pivoting movement in both a vertical and a horizontal plane, so as to orient the tree trunk in either or both planes, for and during debranching.

Also, the debranching device, instead of being fixedly mounted on a beam, can be mounted on a debranching feed means that is movable along the beam, as is the tree feed means.

The tree-gripping means on one beam can be arranged to move away from or towards the tree feed means and debranching means on the other beam, during debranching of the tree. In either case, the tree trunk is drawn in a direction opposite to the simultaneous movement of the debranching means on the other beam.

The relative movement of the two beams is preferably telescopic, with one beam sliding within or beside the other. One beam may be fixed, and one movable, preferably telescopically, or both may be movable, preferably telescopically, with respect to each other.

The relative rates of movement of the feed means and of the debranching means can be adjusted as desired. It is naturally advantageous from the standpoint of energy consumption to move the debranching means at a higher rate than the tree-gripping means, and in fact it is usually unnecessary to move the tree at a rate of speed more than a fraction that of the rate of speed of movement of the debranching means. While the relative rates of movement are in no way critical, and can be adjusted as desired, it is usually advantageous to move the debranching means at a rate of speed at least equal to that of the tree-gripping means, and up to as much as 10 times as fast as the tree-gripping means. In this way, the speed at which the tree is debranched can be quite high, with a rather low power consumption.

The invention is applicable to the use of any type of conventional debranching device. These are well known, and need not be described, since those skilled in the art are well aware of the various types of debranching means available. One available type that is in common use, and is particularly advantageous, is a chain debrancher. Chain cutters usually include a plurality of knives attached to various portions of the chain, and the chain encircles the trunk, so that as the debranching means is moved longitudinally of the trunk, the knives cut through the branches at a point adjacent the trunk. Such devices are shown, for instance, in U.S. Pat. Nos. 3,059,677 and 3,269,436. Other types of debranching means that can be used include rotating circular knives, which encircle and closely engage the tree trunk, and are arranged to cut the branches in a longitudinal direction, more or less parallel to the trunk, and closely abutting the trunk.

The apparatus of the invention can be arranged to operate within a building or outdoors, and can be attached to a frame that is either stationary or movable. It is usually preferable, however, to mount the apparatus on a frame or vehicle which can be moved readily from place to place, on wheels or on a caterpillar track. Such a vehicle can be arranged to be self-powered, so that it is capable of movement by itself, or it can be arranged to be towed by tractors or other vehicles.

Preferred embodiments of the invention are illustrated in the drawings, in which:

FIG. 3 is a side view of such a device; and

FIG. 4 is a perspective end view of the gear drive mechanism of the apparatus of FIG. 3.

Figure 1:
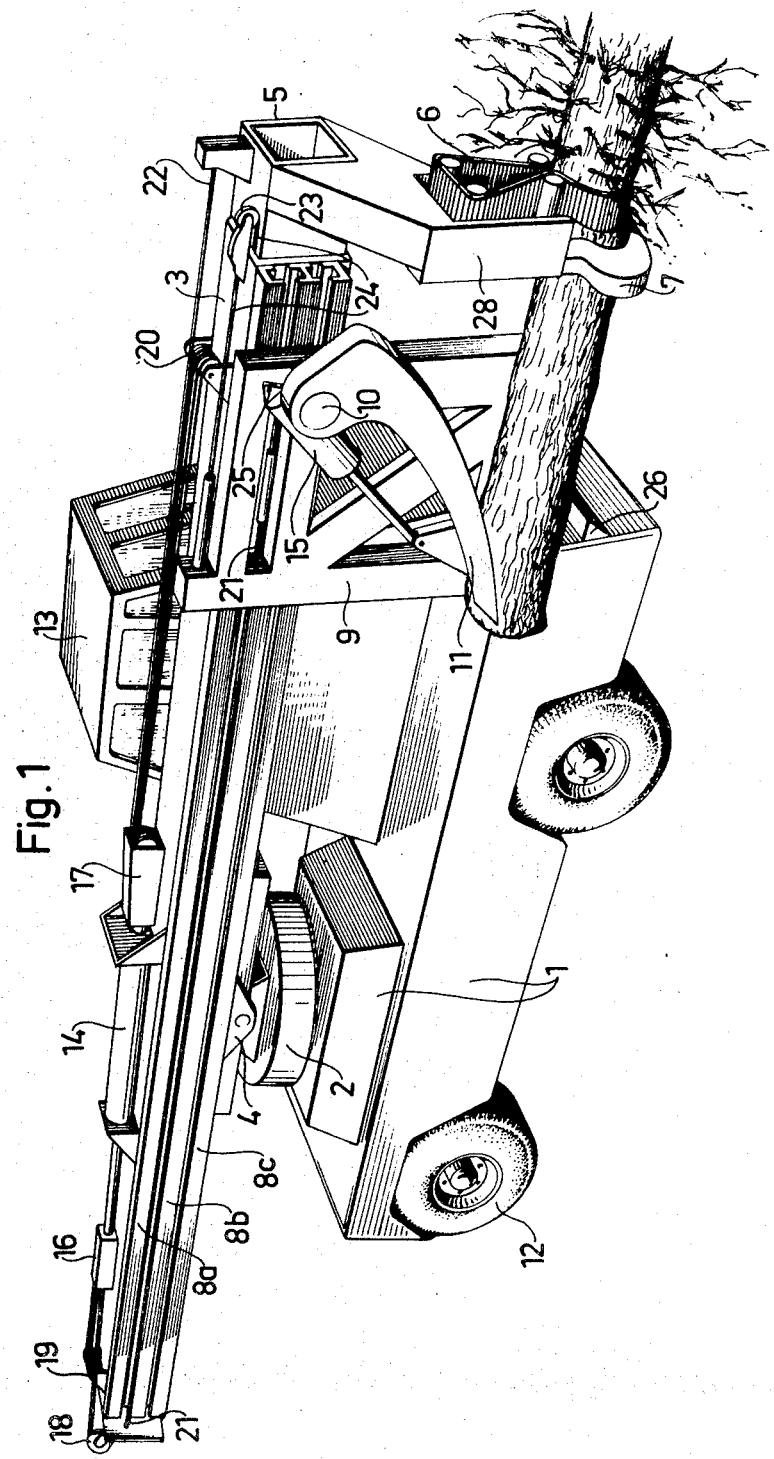
FIG. 1 is a perspective view of an apparatus of the invention mounted on a wheeled vehicle, and shows the drive means for advancing the tree during the debranching operation.

The apparatus shown in FIG. 1 has a frame structure 1 which is mounted on a vehicle supported on four wheels 12. The debranching apparatus of the invention is itself mounted on a cylindrical support structure 2 adapted to rotate on the frame in a horizontal plane. A beam 3, which in this case has a box-shaped cross section, is pivotally mounted on a horizontally extending trunnion 4, in turn mounted to the rotatable support structure 2. The result is that beam 3 is pivotable to and between vertical and horizontal planes, and can be rotated to any angular position with respect to the vehicle, but is fixed against lengthwise movement.

A second beam 5, also of box-shaped cross section, is movable telescopically in the beam 3, so that it can be moved therein between two end positions in a lengthwise direction, and can also assume any position beam 3 can assume. In one of the said end positions, the beam 5 is almost entirely telescoped within the beam 3, and this position is shown in FIG. 1, while in the other of these end positions, the beam 5 is almost fully extended and projects from the front end of the beam 3 and the vehicle. In the device shown, the lengths of the beams 3 and 5 are 10 and 11 meters, approximately 33 and 37 feet, respectively.

In order to keep friction between the moving beams 3, 5 at a minimum, a Teflon slide bearing (not shown) presenting the same cross section as the space between the beams is arranged at the forward end of the beam 3 and the rear end of the beam 5.

The beam 5 supports at its forward end a debranching means 6 in the form of a chain cutter of conventional configuration, and a tree-gripping means 7 which encircles and supports the trunk of the tree while it is being debranched.

On one vertical long side of the beam 3 are attached tree longitudinally extending parallelly juxtaposed T-rails 8a, 8b, 8c, which define therebetween two parallel grooves, within the T-ends of the rails, each having a crosslike cross section. A tree feed carriage 9 having four wheels is arranged, so that the wheels are retained by and run in the crosslike grooves of the rails, and are positively guided by the rails. Secured to the feed carriage 9 is a horizontally extending trunnion 10, on which an arcuate clamp 11 is pivotally mounted.

The vehicle is provided with four large wheels 12, as mentioned above, and can also be provided with a motor for driving either the front or the rear pairs of wheels, or all four simultaneously, in a four wheel drive, and a cabin 13 from which an operator can control both the motor and the various movable members of the apparatus, including the beams 3 and 5. It is, of course, not necessary to provide the vehicle with its own propulsion machinery, since the vehicle can instead be towed by a tractor or other motor vehicle. The wheels 12 can also be fitted with caterpillar tracks, which will increase the movability of the vehicle over rough terrain.

In the device shown in FIG. 1, the beams 3 and 5 and associated movable parts are driven hydraulically. A pump is accordingly installed on the vehicle, in connection with the supporting structure 2, to deliver the oil required for the hydraulic device. The pump unit is driven by the propulsion motor of the vehicle or by the motor of the tractor connected to the vehicle, by means of suitable devices. Also arranged in the supporting structure 2 is a container which can store surplus oil from the hydraulic system. The container communicates with the suction side of the pump unit. None of these parts are shown in FIG. 1, since they are conventional and well known in this art.

The means for rotating the supporting structure 2 with respect to the vehicle 1 are two hydraulic cylinders, which are not shown. With rotation of the supporting structure, the beams 3 and 5 are also rotated. The tree feed carriage 9 and the beam 5 are driven with respect to beam 3 (which is fixed, against lengthwise movement) by means of a common hydraulic cylinder 14, while the clamp 11 mounted in the feed carriage 9 is operated by means of a hydraulic cylinder 15 arranged on the feed carriage 9.

The tree gripping means 7 are of conventional design, and comprise two pivotal gripping claws which are opened and closed by means of hydraulic cylinders (not shown). The debranching means 6 comprises a debranching chain of known design, with cutting knives affixed to the chain, divided into two portions which are secured between respective gripping claws, and a hydraulic motor (not shown) for regulating the tension in the chain. Since the debranching chain is also equipped with gripping means, the chain accompanies the movements of the gripping means, so as to be opened and closed simultaneously therewith.

A hydraulic cylinder 14 is securely attached to the beam 3 approximately centrally between the ends thereof, and has two piston rods, each of which supports at its free end a block 16, 17 having three pulleys. At the rear end of the beam 3 is attached a single pulley block 18, which is slightly offset laterally in relation to the blocks 16, 17. Two pulley blocks 19, 20 are mounted on the beam 3 at the same level as the block 16, 17 one block being located slightly in front of the block 18, and the other at the rear portion of the beam. A line or cable 21 is secured at the rear portion of the feed carriage 9, and is led therefrom to the blocks, so that it runs between the same in the following order: 18, 16, 19, 16, 19, 16. The line or cable passes from the block 16 rearwardly, and is attached at its end to the beam 3. Secured at the front end of the beam 5 is a line or cable 22, which is passed to the blocks 17 and 20, in that order. The line is then passed between the pulleys of blocks 20 and 17, and extended further towards the front portion of the beam 3, to which it is secured.

Secured to the front end of the beam 3 is a single pulley block 23, which is situated slightly in front of the block 20, and slightly offset laterally in relation thereto. A line or cable 24 is secured in the front portion of the tree feed carriage 9, and is extended therefrom towards the block 23. The line is then drawn from the block 23 into the space between the beams 3 and 5, via a recess in the side bearings of the beam 3, and then back to the end of the beam 5, to which it is secured.

By connecting the beams, feed carriage and hydraulic cylinder 14 with cables in this way, the beam 5 and the feed carriage 9 are moved simultaneously by the pistons, and in opposite directions, along the beam 3, the feed carriage 9 moving in the rails 8a, 8b and 8c, when the hydraulic motor is activated. The length of this movement is thus greater than the movement of the piston in the hydraulic cylinder 14 by an extent which corresponds to the number of line or cable portions between the cylinder 14 and the beam 5 and feed carriage 9, respectively. In the device shown in FIG. 1, the stroke of the hydraulic cylinder 14 is 1.5 meters, approximately 5 feet, and the number of line portions is six, so that the maximum span at the extremities of movement of the beam 5 and the feed carriage 9 is 9 meters each, approximately 30 feet, or a total of 18 meters, approximately 60 feet.

Figure 2:
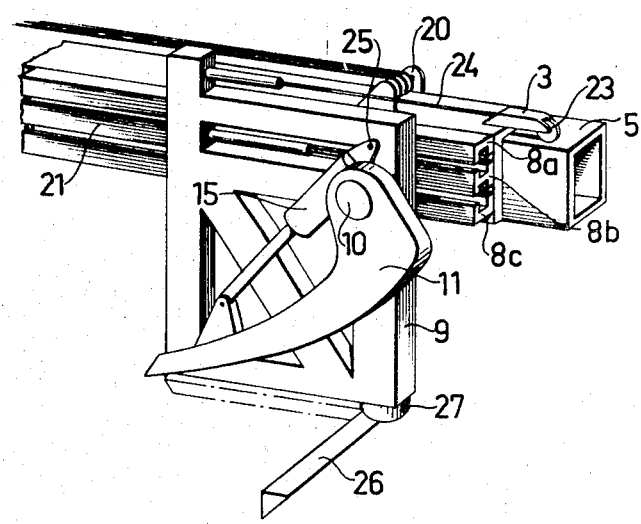
FIG. 2 is a detailed view of the tree feed carriage and arm pivotally mounted thereon, in two end positions, of the apparatus of FIG. 1.

Mounted on the feed carriage 9 somewhat above and to the side of the trunnion 10 of the clamp 11 is a trunnion 25, on which the cylinder of the hydraulic cylinder 15 is rotatably mounted, at the top of the cylinder. The hydraulic cylinder 15 and the clamp 11 extend downwardly from respective trunnions. The clamp is pivotally secured at its lower end to the free end of the piston rod of the hydraulic cylinders. On the bottom surface of the feed carriage 9 is an arm 26 pivotally mounted on a vertically extending trunnion 27 as is best seen in FIG. 2, and is securely mounted in the carriage 9.

A tension spring (not shown) is tensioned between the arm 26 and the carriage 9, and tends to rotate the arm clockwise (seen from beneath). In order to restrict the rotation of the arm, the carriage arm is provided with two shoulders, which are arranged so that the arm 26 when rotated against the spring force to one end position is directed rearwardly, parallel to the direction in which the feed carriage 9 moves, while in its other position, it extends at right angles outwardly from the machine. In FIG. 2, the arm 26 is shown in dashed lines in its rearwardly rotated position, and in full lines in its outwardly extending position.

Securely mounted at the forward end of the beam 5 is a bracket 28, which supports the debranching means 6 and the gripping means 7.

In operation, the apparatus functions in the following manner. The tree to be debranched should be located within approximately 10 meters (approximately 33 feet) from a path or road accessible to the vehicle. The trees are felled so that they lie with their root ends facing the path or road, after which the machine is driven on to the path or road, and positioned as close to the first-felled tree as possible. The supporting structure 2 of the machine then is rotated to a position at which the beams 3 and 5 are directed towards the root end of this tree. The beam 5 then is moved by means of the hydraulic cylinder 14 towards the root end of the tree, until the gripping means 7 and the debranching means 6 are located over the root of the tree. While the beam 5 is being moved, oil from the pump unit is passed to the hydraulic cylinder 14 on the rear side of the piston, while the space at the front of the piston is connected with the container. Upon forward movement of the piston, the tree feed carriage 9 is drawn to the rear of the vehicle by means of the line 21. Because the feed carriage 9 is connected with the beam 5 by means of line 24, the beam 5 will be drawn forward to an extent equal to the extent to which the feed carriage 9 is drawn rearward. Because of an equal number of line portions arranged between the blocks 16 and 19, and between the blocks 17 and 20, no tension occurs in line 22 as the beam moves, but the beam moves without being obstructed by the line.

While the gripping and debranching means are located above the root end of the tree, the beam 3 is pivoted downwardly about the trunnion 4 until the gripping claws on the gripping means 7 can be moved to beneath the tree, whereupon they are closed. The beam 3 is then pivoted upwardly about the trunnion 4, so that the root end is lifted from the ground. If necessary, the supporting structure 2 is swung so that the longitudinal extension of the tree trunk and the beam coincide with each other. The clamp 11 of the feed carriage then is rotated about the trunnion 10 by means of the hydraulic motor 15, until the distance between the clamp and arm 26 (drawn outwardly from the machine by the tension spring) permits the root end of the tree to be inserted between the arm and the clamp. The beam 5 and the motor carriage and the feed carriage 9 are then moved towards each other until the root end of the tree is located between the clamp and the arm on the feed carriage. The beam 3 is then pivoted about the trunnion 4 until the tree rests on the arm 26, whereupon the clamp is rotated until it clamps the tree to the arm.

When the tree is properly secured on the feed carriage 9, the carriage 9 and the beam 5 are then drawn away from each other, upon which the tree trunk is moved in a longitudinal direction through the moving debranching means 6. During passage of the tree through the debranching means, the branches and knots of the tree are urged against the debranching chain, with cutting knives encircling the trunk, and are severed thereby. Because the feed carriage and the debranching means are moved apart during the debranching of the three, the speed at which the tree is fed through the debranching means will correspond to the total speed of the feed carriage 9 and the debranching means 6. In the present case, the speeds of the feed carriage 9 and the debranching means 6 are the same, which means that the speed at which the tree is moved by the carriage in relation to the ground and the frame of the device comprises only half the actual debranching speed. This makes possible a very high feed speed, even with a very heavy tree, without the power consumption being very high. Another advantage is that the dimensions of the apparatus need not be so large as those required by a device which must have a high feed speed, in which the heavy tree trunk must be moved rapidly with respect to a stationary debranching means.

After the entire tree has passed through the debranching means 6 and been fully debranched, the top end of the tree falls down from the debranching means on to the ground. The feed carriage 9 is drawn forward again, by means of hydraulic motor 14, while the hydraulic motor 15 of the clamp 11 is connected with the container. Upon coming into contact with the tree, the arm of the tree carriage is then rotated rearwardly, so that the root end of the tree also falls to the ground.

It will be apparent that the movable members of the apparatus need not be operated hydraulically, but can be drawn by other power means, such as electric motors.

Figure 3:
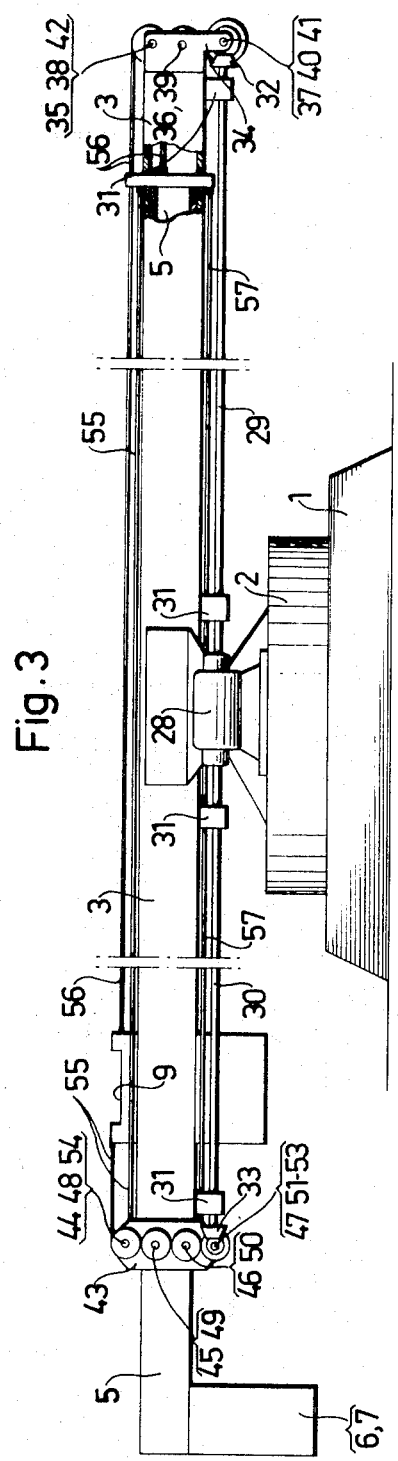
FIGS. 3 and 4 illustrate a further embodiment of the drive means for advancing the tree during the debranching operation, in which the drive means is electrically operated.

For the purpose of driving the beam 5 and the feed carriage 9, it is also possible to use gears, racks or chain drives, instead of the cables and block and pulley arrangement described in FIGS. 1 and 2. FIG. 3 shows diagrammatically such an embodiment. The reference numerals to like parts are the same as FIGS. 1 and 2.

Figure 4:
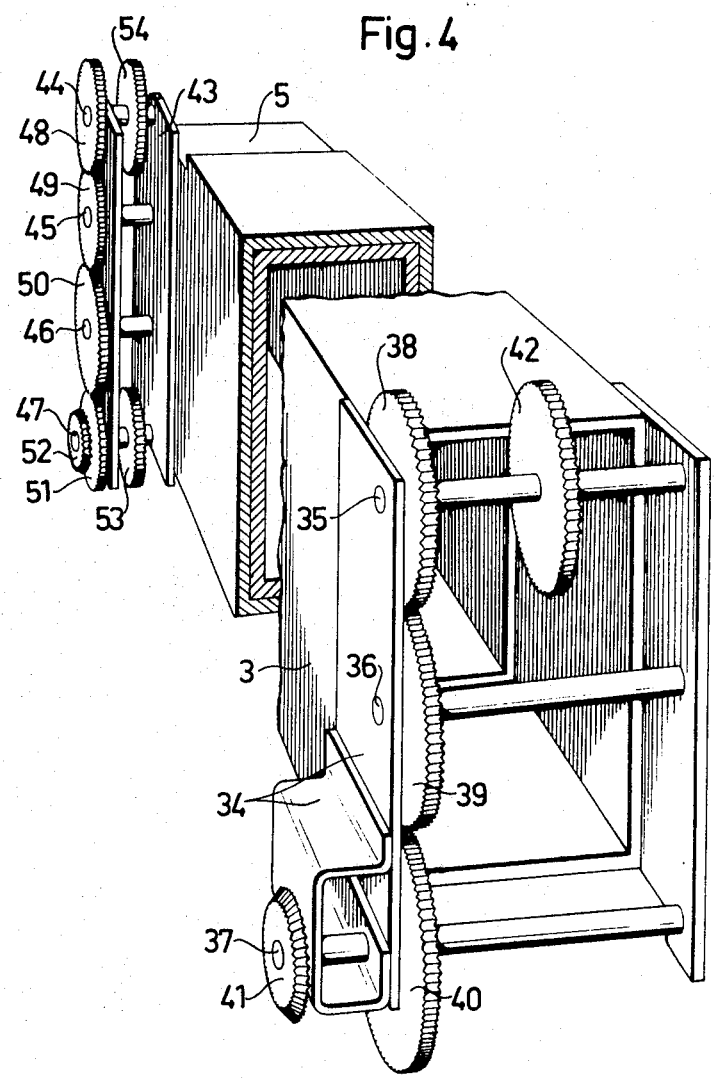

In the device shown in FIG. 3, an electric motor 28' is arranged on the supporting structure 2. To each end of the motor shaft is connected a shaft 29, 30, via a shaft arranged in the motor. The shafts 29 and 30 are rotatably journaled in bearings 31 mounted on the beam 3. Secured in the free end of the respective shafts are conical gears 32, 33. At the rear end of the beam 3 is mounted a bracket 34, in which three shafts 35, 36, 37 are mounted for rotation. To these shafts are secured three cylindrical gears 38, 39, 40 in interengaging relationship, and also secured to the shaft 37 is a conical gear 41. These gears are best seen in FIG. 4. The gear 41 is in engagement with the conical gear 32 on the shaft 29.

Securely mounted on the shaft 35 is a sprocket wheel 42 positioned adjacent to the gear 38. At the front end of the beam 3 is mounted a bracket 43, in which four shafts 44, 45, 46, 47 are mounted for rotation. Four cylindrical gears 48, 49, 50, 51 are secured on these shafts, in intermeshing relationship. On the shaft 47 there is also mounted a conical gear 52, and a chain or sprocket wheel 53, on each side of the gear 51, the conical gear engaging with the gear 53 on the shaft 30. Mounted on the shaft 44 on the inside of the gear 48 is a gear 54.

Securely mounted in the rear end of the beam 5 is a roller chain 55. The roller chain is drawn from the end of the beam forwardly in a groove on the upper surface of the beam and over the gear wheel 54, and from there fed rearwardly to the feed carriage 9, to which it is secured. For illustrative purposes, the beam 5 in FIGS. 3 and 4 has been provided with an upwardly extending arm in which the roller chain is secured. The roller chain can, however, be arranged in the space between the beams 3 and 5.

Securely attached to the rear end of the beam 5 is a roller chain 56, which is drawn rearwardly to and over the ratchet wheel 42, and from there forwardly to the feed carriage 9, to which it is secured.

A roller chain 57 is secured in the front end of the beam 5, whence it is drawn rearwardly to and over the ratchet wheel 53, and then to the rear end of the beam 5, to which it is secured. For illustrative purposes, this chain is also shown outside the beam 3, but it can be in the space between the beams 3 and 5.

As is evident from the construction described, the beam 5 and the feed carriage 9 will move simultaneously with each other and in opposite directions, when the motor 28' is operated.

Having regard to the foregoing disclosure, the following is claimed as the inventive and patentable embodiments thereof:

1. An apparatus for debranching felled trees at a high rate of speed, which comprises, in combination, a pair of beam members movable towards and away from each other along corresponding longitudinal axes; means of effecting such relative movement; tree-gripping means and debranching means attached to one beam member and arranged, respectively, to grasp a tree trunk and to remove branches from the trunk; tree feed means attached to the other beam member, the other beam member having a track extending along a corresponding longitudinal axis, and the tree feed means being arranged to move along the track on the beam member; gripping means attached to the tree feed means and arranged to grasp a tree trunk; and means for moving the tree feed means along the track in a direction opposite to the direction of and simultaneously with movement of the debranching means.

2. Apparatus according to claim 1 in which at least one of the beams is arranged for pivoting and rotational movement in both a vertical and a horizontal plane, to orient a tree trunk in either or both planes for and during debranching.

3. Apparatus according to claim 1 in which the means for effecting relative movement is a hydraulic cylinder and piston operating cables attached to the two beams.

4. Apparatus according to claim 1 in which the means for effecting relative movement is an electric motor operating the two beams by a gear, a sprocket wheel and chain assembly.

5. Apparatus according to claim 1 in which the gripping means includes at least one pivotally movable clamping member.

6. Apparatus according to claim 1 in which the debranching means is a chain cutter.

7. Apparatus according to claim 1, mounted on a wheeled frame movable along the ground on the wheels.

8. Apparatus according to claim 1, in which the tree-gripping means on one beam is arranged to move away from the feed means and debranching means on the other beam, and thus draw the tree trunk in a direction opposite to the simultaneous movement of the debranching means on the other beam.

9. Apparatus according to claim 1 in which the beam members are arranged to move telescopically with respect to each other.

10. Apparatus according to claim 9 in which one of the beam members is arranged for pivoting and rotational movement in both a vertical and horizontal plane, and the other is movable telescopically with respect to the pivotable and rotatable beam member.

11. Apparatus according to claim 10 in which the tree feed means is arranged to move on rails attached to the pivotable and rotatable beam member, and the other beam member telescopes within the pivotable and rotatable beam member.

12. An apparatus for debranching felled trees at a high rate of speed, which comprises, in combination, a pair of telescopic beam members of substantially equal length movable at high speed towards and away from each other; means for effecting such relative movement; tree-gripping means and debranching means attached to one beam member and arranged respectively to grasp a tree trunk and to remove branches from the trunk; tree feed means attached to the other beam member and arranged to move along the beam member; gripping means attached to the tree feed means and arranged to grasp a tree trunk; and means for moving the tree feed means in a direction opposite to the direction of and simultaneously with movement of the debranching means, at a speed ranging from the same speed to about one-tenth the speed of the debranching means and over substantially the same distance.

13. Apparatus according to claim 12 in which at least one of the beams is arranged for pivoting and rotational movement in both a vertical and horizontal plane, to orient a tree trunk in either or both planes for and during debranching.

14. Apparatus according to claim 12 in which the means for effecting relative movement is a hydraulic cylinder and piston operating cables attached to the two beams.

15. Apparatus according to claim 12 in which the gripping means includes at least one pivotably movable clamping member.

16. Apparatus according to claim 12 in which the debranching means is a chain cutter.

17. Apparatus according to claim 12 in which the tree feed means is arranged to move along a track on the beam member.

18. Apparatus according to claim 17 in which one of the beam members is arranged for pivoting and rotational movement in both a vertical and horizontal plane, and the other is movable telescopically with respect to the pivotable and rotatable beam member.

19. Apparatus according to claim 18 in which the tree feed means is arranged to move on rails attached to the pivotable and rotatable beam member, and the other beam member telescopes within the pivotable rotatable beam member.

20. An apparatus for debranching felled trees at a high rate of speed, which comprises, in combination, a pair of beam members movable towards and away from each other; means for effecting such relative movement; tree-gripping means and debranching means attached to one beam member and arranged respectively to grasp a tree trunk and to remove branches from the trunk; tree feed means attached to the other beam member and arranged to move along the beam member; gripping means attached to the tree feed means and arranged to grasp a tree trunk comprising a clamping member pivotable about an arc extending along the longitudinal axis of a tree to be clamped thereby; and an arm pivotable about an arc extending across the longitudinal axis of a tree into a position to retain a tree against the clamping action of the clamping member; and means for moving the tree feed means in a direction opposite to the direction of and simultaneously with movement of the debranching means.

21. Apparatus according to claim 20 in which at least one of the beams is arranged for pivoting and rotational movement in both a vertical and horizontal plane, to orient a tree trunk in either or both planes for and during debranching.

22. Apparatus according to claim 20 in which the means for effecting movement of the clamping member into and away from gripping engagement with a tree trunk is a hydraulic cylinder.

23. Apparatus according to claim 20 in which the debranching means is a chain cutter.

24. Apparatus according to claim 20, in which the tree-gripping means on one beam is arranged to move away from the feed means and debranching means on the other beam, and thus draw the tree trunk in a direction opposite to the simultaneous movement of the debranching means on the other beam.

25. Apparatus according to claim 20 in which the beam members are arranged to move telescopically with respect to each other.

26. Apparatus according to claim 25 in which one of the beam members is arranged for pivoting and rotational movement in both a vertical and horizontal plane, and the other is movable telescopically with respect to the pivotable and rotatable beam member.

27. Apparatus according to claim 26 in which the tree feed means is arranged to move on rails attached to the pivotable and rotatable beam member, and the other beam member telescopes within the pivotable and rotatable beam member.

28. An apparatus for debranching felled trees from the root end thereof at a high rate of speed, which comprises, in combination, a pair of telescopic beam members of substantially equal length movable at high speed towards and away from each other; means for effecting such relative movement; tree-gripping means and debranching means attached to one beam member and arranged respectively to grasp a tree trunk at its root end and to remove branches from the trunk, root end first; tree feed means attached to the other beam member and arranged to move along the beam member; gripping means attached to the tree feed means and arranged to grasp a tree trunk at its root end; and means for rapidly and simultaneously moving the tree feed means and debranching means in opposite directions and at a speed ranging from the same speed to about one-tenth the speed of the debranching means over substantially the same distance.

29. Apparatus according to claim 28 in which at least one of the beams is arranged for pivoting and rotational movement in both a vertical and horizontal plane, to orient a tree trunk in either or both planes for and during debranching.

30. Apparatus according to claim 28 in which the gripping means includes a pivotable arm and a pivotably movable clamping member arranged to clamp the tree against the arm, the arm being pivotable horizontally between tree-clamping and tree-releasing positions, and the clamping member being pivotable vertically between tree-clamping and tree-releasing positions.

31. Apparatus according to claim 28 in which the tree feed means on one beam is arranged to move along a track on the beam in a direction opposite to the debranching means on the other beam, while the latter beam moves telescopically in relation to the first beam.

32. Apparatus according to claim 31 in which one of the beam members is arranged for pivoting and rotational movement in both a vertical and horizontal plane, and the other is movable telescopically with respect to the pivotable and rotatable beam member.

33. Apparatus according to claim 32 in which the tree feed means is arranged to move on rails attached to the pivotable and rotatable beam member, and the other beam member telescopes within the pivotable and rotatable beam member.

34. An apparatus for debranching felled trees from the root end thereof at a high rate of speed, which comprises, in combination, a pair of telescopic beam members of substantially equal length movable at high speed towards and away from each other, at least one of the beams being arranged for pivoting and rotational movement in both a vertical and horizontal plane, to orient a tree trunk in either or both planes for and during debranching and the other being movable telescopically with respect to the pivotable and rotatable beam member; means for effecting such movement; tree-gripping means and debranching means attached to the telescopic beam member and arranged respectively to grasp a tree trunk, pivotable and rotatable at its root end and to remove branches from the trunk, root end first; a track on the beam member, and tree feed means attached to the beam member and arranged to move along the track; gripping means attached to the tree feed means and arranged to grasp a tree trunk at its root end; and means for rapidly and simultaneously moving the tree feed means and debranching means in opposite directions and at a speed ranging from the same speed to about one-tenth the speed of the debranching means over substantially the same distance.